(12) United States Patent
Mihai

(10) Patent No.: US 8,322,771 B2
(45) Date of Patent: Dec. 4, 2012

(54) CONNECTION BETWEEN ROOF PANEL AND SIDE PANEL

(75) Inventor: Ovidiu Cristian Mihai, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 511 days.

(21) Appl. No.: 12/573,267

(22) Filed: Oct. 5, 2009

(65) Prior Publication Data
US 2011/0080024 A1    Apr. 7, 2011

(51) Int. Cl.
*B62D 25/06*    (2006.01)

(52) U.S. Cl. ............... 296/29; 296/193.12; 296/203.03; 296/210; 29/897.2

(58) Field of Classification Search ............ 296/216.06, 296/216.09, 210, 203.03, 193.12, 187.13, 296/29, 30, 203.01; 29/897.2; 156/272.8, 156/311, 320
See application file for complete search history.

(56) References Cited

U.S. PATENT DOCUMENTS

| | | | |
|---|---|---|---|
| 4,957,326 A * | 9/1990 | Chiba et al. .................. 296/210 |
| 5,619,784 A | 4/1997 | Nishimoto et al. |
| 6,283,541 B1 | 9/2001 | Kim |
| 6,328,376 B2 * | 12/2001 | Son ......................... 296/203.03 |
| 7,163,254 B2 | 1/2007 | Fischer |
| 7,226,106 B2 | 6/2007 | Kobayashi et al. |
| 7,229,113 B2 | 6/2007 | Lendway, IV et al. |
| 7,431,378 B2 | 10/2008 | Chen et al. |
| 7,456,238 B2 | 11/2008 | Koshida et al. |
| 7,467,452 B2 | 12/2008 | Lande et al. |
| 7,494,178 B2 | 2/2009 | Nygaard |
| 7,508,406 B2 | 3/2009 | Oehrlein |
| 7,997,643 B2 * | 8/2011 | Shah et al. .................... 296/210 |
| 8,123,286 B2 * | 2/2012 | Furusako et al. ........ 296/203.03 |
| 2003/0176128 A1 | 9/2003 | Czaplicki et al. |
| 2009/0102233 A1 * | 4/2009 | Tomozawa .............. 296/187.02 |
| 2009/0117403 A1 | 5/2009 | Sutcliffe et al. |
| 2011/0080024 A1 * | 4/2011 | Mihai ..................... 296/216.09 |

* cited by examiner

*Primary Examiner* — Glenn Dayoan
*Assistant Examiner* — Gregory Blankenship
(74) *Attorney, Agent, or Firm* — Clifford B. Vaterlaus; Emerson Thomson Bennett

(57) ABSTRACT

A vehicle may include a roof panel having a segment that is formed of a thermoplastic material, a side panel having a segment that is formed of a metal, and a connection device. The roof panel may be connected to the side panel member by attaching the connection device to the side panel segment, heating the roof panel segment to melt at least a portion of it, enveloping the connection member within the melted portion of the roof panel segment; and, cooling the components.

20 Claims, 2 Drawing Sheets

CONNECTION BETWEEN ROOF PANEL AND SIDE PANEL

I. BACKGROUND

A. Field of Invention

This invention pertains to the art of methods and apparatuses related to vehicle construction and more specifically to methods and apparatuses related to the connection of vehicle roof panels to side panels.

B. Description of the Related Art

It is well known in the automotive industry to attach roof panels to side panels. Typically, the roof panel is formed of steel and the side panel (sometimes referred to as a side panel outer, or SPO) is also formed of steel. In this case, it is relatively easy to connect the roof panel to the side panel in a welding operation.

It is also known, however, to form roof panels out of various thermoplastics, such as fiber reinforced (composite) plastics. This usually means the roof panel is formed of a carbon fiber reinforced thermoplastic, or the like. In some specific cases, the thermoplastic roof panel may be transparent. A problem with thermoplastic roof panels is that they are more difficult to connect to the steel (or other metal) side panels because the different materials make the panels incompatible for welding operations.

Various methods for connecting thermoplastic roof panels to steel side panels are known. They include the use of adhesives, bolts, and rivets. While these methods and apparatuses generally work well for their intended purposes, they have disadvantages. Disadvantages to the use of adhesives include relatively high cost and relatively limited connection strength. Disadvantages to the use of bolts include increased weight and increased manpower for assembly. Disadvantages to the use of rivets include limitations in types of rivets that can be used, relatively high cost, relatively limited connection strength, and increased manpower for assembly. A common disadvantage to all types of fasteners (whether bolts, rivets, or other fasteners) is that their visibility is often considered undesirable to customers.

Therefore, what is needed is a method for connecting thermoplastic roof panels to side panels in a manner to reduce or eliminate the disadvantages known in the art.

II. SUMMARY

According to one embodiment of this invention, a method comprises the steps of: (A) providing a vehicle roof panel member that has a first segment that is formed of a thermoplastic material having a melting temperature; (B) providing a vehicle side panel member that has a second segment; (C) providing at least one connection member, having melting temperature that is substantially greater than the melting temperature of the first segment, to the second segment; (D) juxtaposing the first segment with the connection member; (E) heating the first segment to melt at least a portion of the first segment; (F) enveloping at least a portion of the connection member within the melted portion of the first segment; and, (G) cooling the first segment to connect the first segment to the second segment.

According to another embodiment of this invention, an assembly comprises: an automotive roof panel member that has a first segment that is formed of a thermoplastic material having a melting temperature; a first automotive side panel member that has a second segment that is formed of a metal; and, a first connection member, having a melting temperature that is substantially greater than the melting temperature of the first segment, attached to the second segment. The automotive roof panel member may be connected to the first automotive side panel member with the following method: juxtaposing the first segment with the first connection member; heating the first segment to melt at least a portion of the first segment; enveloping at least a portion of the first connection member within the melted portion of the first segment; and, cooling the first segment to connect the first segment to the second segment.

According to yet another embodiment of this invention, an assembly comprises: a first vehicle support structure member that has a first segment that is formed of a thermoplastic material having a melting temperature; a second vehicle support structure member that has a second segment that is formed of steel; and, a first connection member formed of steel that is attached to the second segment. The first vehicle support structure member may be connected to the second vehicle support structure member with the following method: juxtaposing the first segment with the first connection member; heating the first segment to melt at least a portion of the first segment; enveloping at least a portion of the first connection member within the melted portion of the first segment; and, cooling the first segment to connect the first segment to the second segment.

One advantage of this invention is that adhesives are not required. The roof panel/side panel connection is thus made in a more economic manner with greater relative connection strength.

Another advantage of this invention is that bolts are not required. The roof panel/side panel connection is thus made in a relatively lower weight manner with relatively less manpower required.

Another advantage of this invention is that rivets are not required. The roof panel/side panel connection is thus made without the disadvantages of rivets discussed above.

Yet another advantage of this invention is that fasteners are not required. The roof panel/side panel connection is thus made without fasteners being visible.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
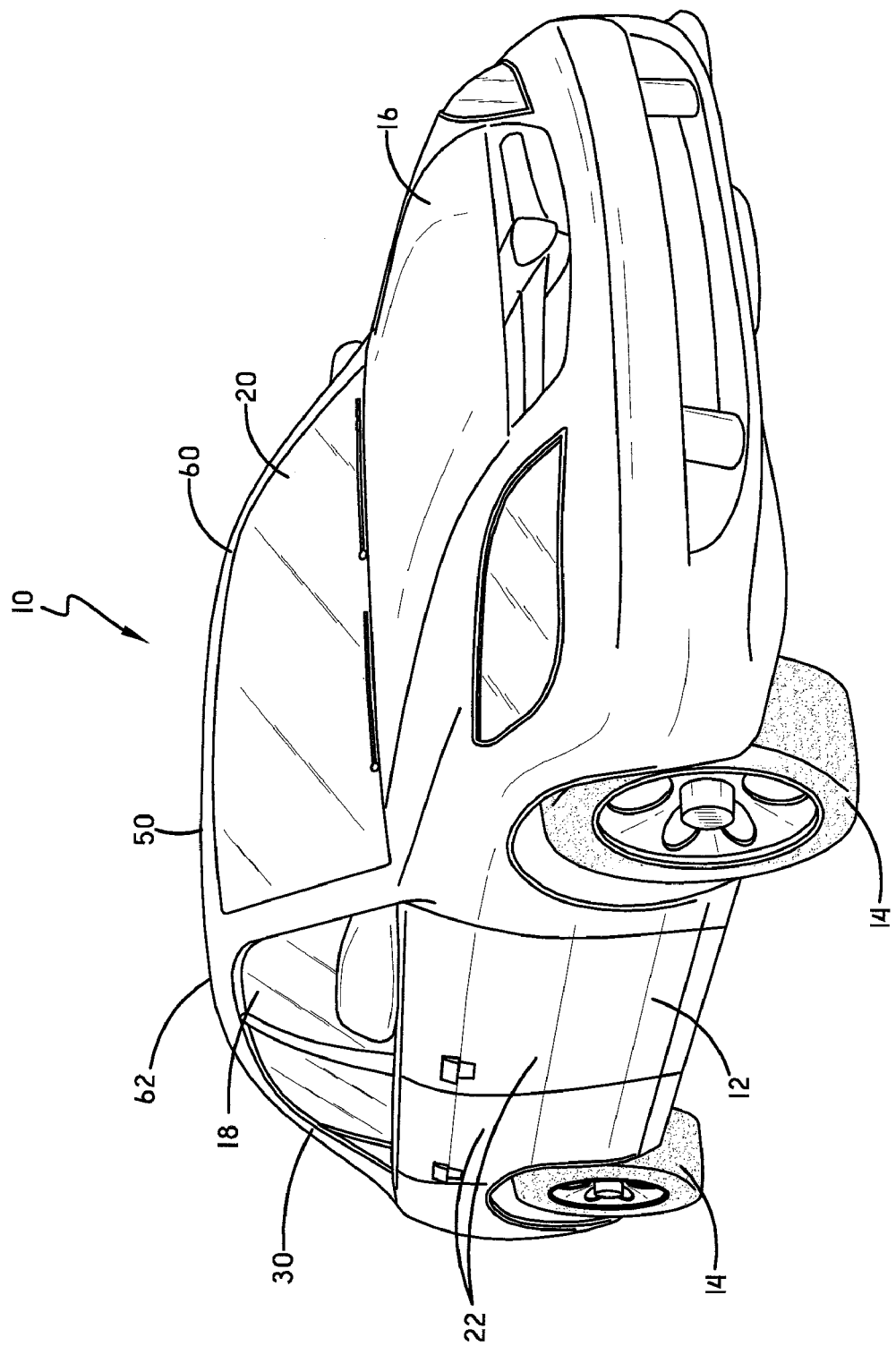
FIG. 1 is a front perspective view of a vehicle.

Referring now to the drawings wherein the showings are for purposes of illustrating embodiments of the invention only and not for purposes of limiting the same, and wherein like reference numerals are understood to refer to like components, FIG. 1 shows a vehicle 10 that may be equipped with at least one side panel 30 and at least one roof panel 50 that are connected according to one embodiment of this invention. While the vehicle 10 shown is a sedan, it should be understood that this invention will work with any vehicle including, for some non-limiting examples, automobiles, trucks, sports utility vehicles (SUVs), aircraft, trains and boats. The vehicle 10 may include a frame 12, one or more ground engaging wheels 14 mounted to the frame 12, and a locomotion source 16, mounted to the frame 12, for use in providing locomotion for the vehicle 10. The vehicle 10 may also include have a passenger compartment 18 which houses one or more passengers as is well known in the art. The passenger compartment 18 may be bordered by a front windshield 20, a rear windshield or window (not visible but well known to those of skill in the art), one or more doors 22, one or more side panel members 30, at least one roof panel member 50, and a floor (not visible but well known to those of skill in the art). By "side panel member" it is meant a support structure component that makes up at least a portion of the vehicle's side. By "roof panel member" it is meant a support structure component that makes up at least a portion of the vehicle's roof As the use and structure of these vehicle components are well known to those of skill in the art, additional details will not be provided, except as discussed below.

Figure 2:
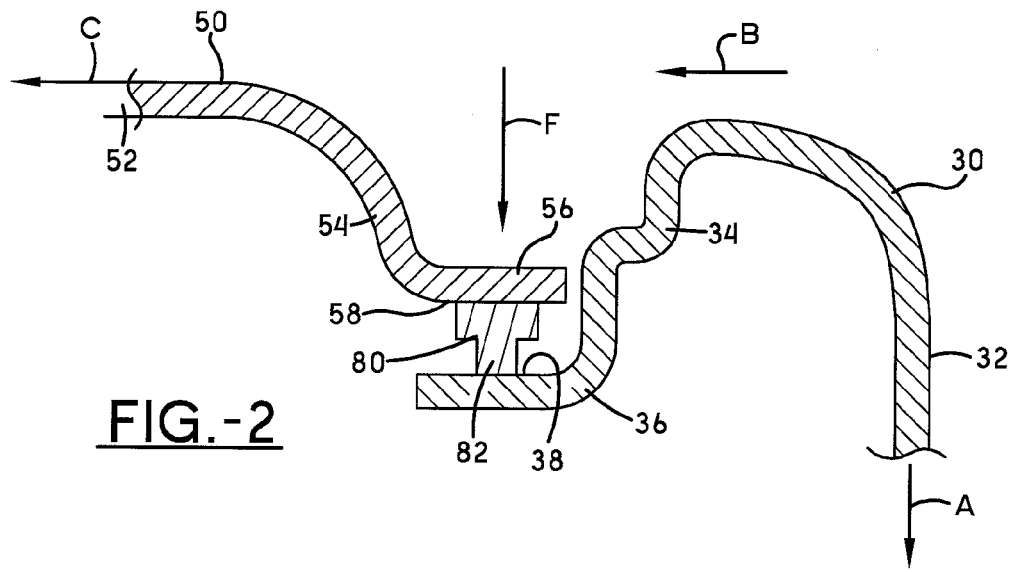
FIG. 2 is a cross-sectional view of a roof panel member and a side panel member prior to being connected.

With reference now to FIGS. 1-2, the side panel member 30 may have a first section 32 that extends downward in direction A to support the roof panel member 50 to the frame 12. The side panel member 30 may have a second section 34 that extends laterally in direction B. The second section 34 may have a segment 36 used to connect to the roof panel member 50 as will be discussed further below. The segment 36 can be of any shape and material chosen with the sound judgment of a person of skill in the art. For the embodiment shown, the segment 36 has a generally planar upwardly facing outer surface 38. The segment 36 may be formed of a metal and in one embodiment is formed of steel. The segment 36 may be formed of a material distinct from the rest of the side panel member 30 or, in another embodiment, may be formed of the same material, such as steel. In one embodiment the side panel member 30, including the first and second sections 32, 34, is made in a stamping process as is well known to those of skill in the art. It should be understood that one side panel member 30 may be used on one side of the vehicle 10 and a second side panel member 30 may be used on the other side of the vehicle 10. One or more side panel members 30 may be used on each side of the vehicle 10.

With continuing reference now to FIGS. 1-2, the roof panel member 50 may have a first section 52 that extends laterally in direction C to define the roof for the vehicle 10 in a known manner to those of skill in the art. The roof panel member 50 may have a second section 54 that includes a segment 56 used to connect to one or more side panel members 30 as will be discussed further below. The segment 56 can be of any shape and thermoplastic material chosen with the sound judgment of a person of skill in the art. For the embodiment shown, the segment 56 has a generally planar downwardly facing outer surface 58. The segment 56 may be formed of a fiber reinforced thermoplastic where the fiber is of any material chosen with the sound judgment of a person of skill in the art. The segment 56 may be formed of a material distinct from the rest of the roof panel member 50 or, in another embodiment, the entire roof panel member 50 may be formed of the same thermoplastic material. The roof panel member 50 may be, for example, transparent. In one embodiment the roof panel member 50, including the first and second sections 52, 54, is made in an extrusion process as is well known to those of skill in the art. It should be understood that the roof panel member 50 may have, as shown in FIG. 1, a first side 60 that connects to one or more side panel members 30 on one side of the vehicle 10 and a second side 62 that connects to one or more side panel members 30 on the other side of the vehicle 10. One or more roof panel members 50 may be used to define the roof for the vehicle 10.

Figure 3:
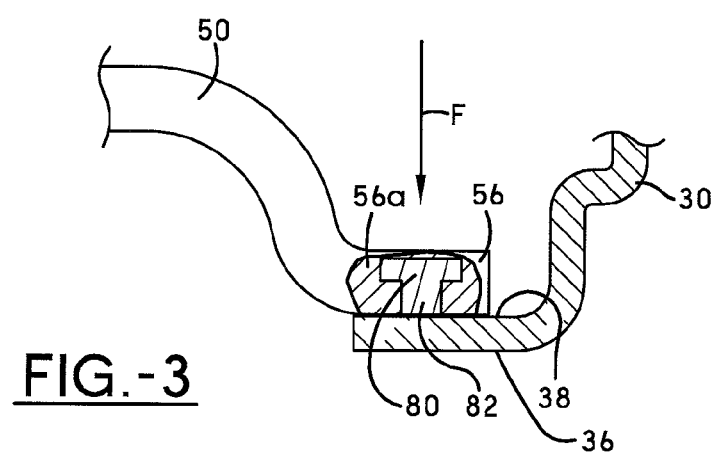
FIG. 3 is a cross-sectional view of a roof panel member and a side panel member after they are connected.
Figure 4:
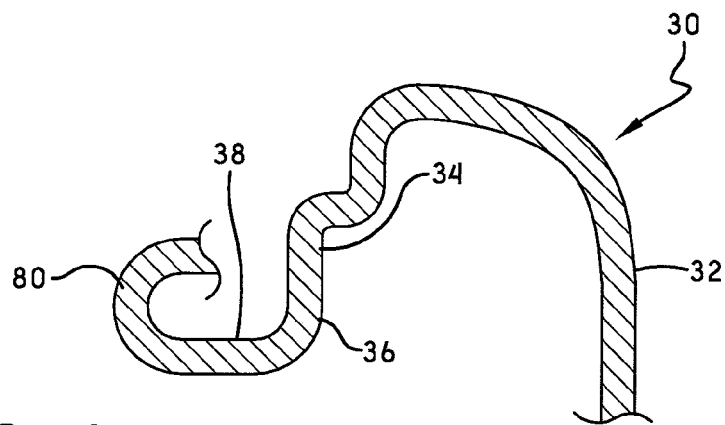
FIG. 4 is a cross-sectional view of another embodiment side panel member.

With reference now to FIGS. 2-4, one or more connection members 80 may be used to connect one or more roof panel members 50 to one or more side panel members 30. The number of connection members 80 used as well as their shape and the material they are made of can be any chosen with the sound judgment of a person of skill in the art. In one embodiment, a single continuous connection member 80 extends along the length of side panel member 30 segments 36 on each side of the vehicle 10. In another embodiment, a connection member 80 may be an individual stud 82. In this case, a plurality of individual studs 82 may be used along the length of side panel member 30 segments 36 on each side of the vehicle 10. The studs 82 may have any shape chosen with the sound judgment of a person of skill in the art. For the embodiment shown, the studs 82 are T-shaped. The connection member 80, whether continuous or an individual stud 82, may be formed in an extrusion process. Each connection member 80 may be formed of a metal and in one embodiment is formed of steel. The connection member(s) 80 may be attached in any manner chosen with the sound judgment of a person of skill in the art. In one embodiment, the connection member(s) 80 may be attached to the side panel member 30 segments 36. In an alternate embodiment, the connection member(s) 80 may be attached to the roof panel member 50 segments 56. The attachment of the connection member(s) 80 may be via welding, rivets, adhesives and/or using any other method known to those of skill in the art. In another embodiment, the connection member 80 is not a separate part but is an integral part of the side panel member 30 or roof panel member 50. In one embodiment, the connection member 80 is formed by adjusting the shape of the segment 36. In a specific non-limiting embodiment, shown in FIG. 4, the connection member 80 is formed by curling up an end of the segment 36.

With reference now to FIGS. 1-4, methods for connecting one or more roof panel members 50 to one or more side panel members 30 will now be described. In one embodiment where the connection member(s) 80 are first attached to the side panel member 30 segments 36, the roof panel member 50 segment 56 is juxtaposed to the connection member(s) 80, as shown in FIG. 2. The roof panel member 50 segment 56 is then heated in any manner chosen with the sound judgment of a person of skill in the art. In one embodiment, the segment 56 is heated directly while in another embodiment, the segment 56 is heated by first heating the connection member(s) 80. Heat is then transferred from the connection member 80 to the segment 56. In one embodiment, the heat is provided by a laser beam, directly to the segment 56 or to the connection member 80, in a known manner. The connection member 80 has a melting temperature that is greater than the melting temperature of the thermoplastic segment 56. The heat transferred to the segment 56 may thus be adjusted to be enough to melt at least a portion of the thermoplastic but not enough to melt the connection member 80. This is illustrated in FIG. 3. With the segment 56 in a molten condition 56a, the molten portion 56a envelopes the connection member 80. The amount of envelopment can be any chosen with the sound judgment of a person of skill in the art. In one embodiment, shown in FIG. 3, envelopment is continued until the surface 58 of the segment 56 comes into contact with the surface 38 of the segment 36. Depending on the particular materials used, the weight of the roof panel member 50 alone may be sufficient to cause the connection member 80 to be enveloped within the melted portion of the segment 56. In another embodiment, a force may be applied to cause relative movement of the roof panel member 50 toward the side panel member 30 to cause the connection member 80 to be enveloped within the melted portion of the segment 56. In one specific embodiment, a force F may be applied to the roof panel member 50 causing it to move generally downward with respect to the side panel member 30. After the connection member 80 has been enveloped within the segment 56, any final relative positioning adjustment of the roof panel member 50 with respect to the side panel member 30 (whether vertically or laterally) may be made to achieve proper alignment. Finally, the components are cooled so that the melted portion 56a of the segment 56 hardens around the connection member 80. Any manner of cooling chosen with the sound judgment of a person of skill in the art, can be used with this invention. In one embodiment, the components are simply exposed to room temperatures for this purpose.

With continuing reference to FIGS. 1-4, in another embodiment where the connection member(s) 80 are first attached to the roof panel member 50 segments 56, the method for connecting one or more roof panel members 50 to one or more side panel members 3 is similar to that described in the previous paragraph. In this case, however, the side panel member 30 segment 36 is heated in any manner chosen with the sound judgment of a person of skill in the art, such as by a laser beam as discussed above. With the segment 36 in a molten condition, the molten portion (not shown) envelopes the connection member 80. A force may be applied to cause relative movement of the roof panel member 50 toward the side panel member 30 to cause the connection member 80 to be enveloped within the melted portion of the segment 36. After the connection member 80 has been enveloped within the segment 36, any final relative positioning adjustment of the roof panel member 50 with respect to the side panel member 30 (whether vertically or laterally) may be made to achieve proper alignment. Finally, the components are cooled so that the melted portion of the segment 36 hardens around the connection member 80.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. A method comprising the steps of:
   (A) providing a vehicle roof panel member that has a first segment that is formed of a thermoplastic material having a melting temperature;
   (B) providing a vehicle side panel member that has a second segment;
   (C) providing at least one connection member, having melting temperature that is substantially greater than the melting temperature of the first segment, to the second segment;
   (D) juxtaposing the first segment with the connection member;
   (E) heating the first segment to melt at least a portion of the first segment;
   (F) enveloping at least a portion of the connection member within the melted portion of the first segment; and,
   (G) cooling the first segment to connect the first segment to the second segment.

2. The method of claim 1 wherein:
   step (B) comprises the step of: providing the second segment to be formed of steel; and,
   step (C) comprises the step of: providing the connection member to be formed of steel.

3. The method of claim 1 wherein step (C) comprises the step of:
   welding the connection member to the second segment.

4. The method of claim 1 wherein step (C) comprises the step of:
   adjusting the shape of the second segment to form the connection member.

5. The method of claim 1 wherein step (E) comprises the step of:
   heating the connection member to melt at least a portion of the first segment.

6. The method of claim 5 wherein step (E) comprises the step of:
   using a laser beam to heat the connection member.

7. The method of claim 1 wherein step (F) comprises the step of:
   using only the weight of the vehicle roof panel member to cause the connection member to be enveloped within the melted portion of the first segment.

8. The method of claim 1 wherein step (F) comprises the step of:
   applying a force to cause relative movement of the vehicle roof panel member toward the side panel member to cause the connection member to be enveloped within the melted portion of the first segment.

9. An assembly comprising:
   an automotive roof panel member that has a first segment that is formed of a thermoplastic material having a melting temperature;
   a first automotive side panel member that has a second segment that is formed of a metal;
   a first connection member, having a melting temperature that is substantially greater than the melting temperature of the first segment, attached to the second segment; and,
   wherein the automotive roof panel member is connected to the first automotive side panel member with the following method:
   juxtaposing the first segment with the first connection member;
   heating the first segment to melt at least a portion of the first segment;
   enveloping at least a portion of the first connection member within the melted portion of the first segment; and,
   cooling the first segment to connect the first segment to the second segment.

10. The assembly of claim 9 wherein:
    the first segment is positioned on a first side of the automotive roof panel member;
    the automotive roof panel member has a third segment positioned on a second side of the automotive roof panel member, wherein the third segment is formed of a thermoplastic material;
    the automotive assembly further comprises:
    a second automotive side panel member that has a fourth segment that is formed of a metal; and,
    a second connection member attached to the fourth segment; and,
    wherein the automotive roof panel member is connected to the second automotive side panel member with the following method:
    juxtaposing the third segment with the second connection member;

heating the third segment to melt at least a portion of the third segment;

enveloping at least a portion of the second connection member within the melted portion of the third segment; and, cooling the third segment to connect the third segment to the fourth segment.

11. The assembly of claim 9 wherein:

the first connection member is welded to the second segment.

12. The assembly of claim 9 further comprising:

a second connection member, having a melting temperature that is substantially greater than the melting temperature of the first segment, attached to the second segment; and, wherein the method of connecting the automotive roof panel member to the first automotive side panel member comprises the steps of:

heating the first segment to melt a second portion of the first segment; and, enveloping at least a portion of the second connection member within the second melted portion of the first segment.

13. The assembly of claim 12 wherein the first and second connection members are substantially T-shaped.

14. The assembly of claim 9 wherein:

the second segment has a generally planar surface that contacts a generally planar surface of the first segment when the first segment is connected to the second segment; and, the first connection member is a portion of the second segment that extends beyond the planar surface of the second segment.

15. The assembly of claim 9 wherein:

the first connection member is heated to melt the at least a portion of the first segment.

16. An assembly comprising:

a first vehicle support structure member that has a first segment that is formed of a thermoplastic material having a melting temperature;

a second vehicle support structure member that has a second segment that is formed of steel;

a first connection member formed of steel that is attached to the second segment; and, wherein the first vehicle support structure member is connected to the second vehicle support structure member with the following method:

juxtaposing the first segment with the first connection member;

heating the first segment to melt at least a portion of the first segment;

enveloping at least a portion of the first connection member within the melted portion of the first segment; and, cooling the first segment to connect the first segment to the second segment.

17. The assembly of claim 16 wherein:

the first connection member is welded to the second segment.

18. The assembly of claim 16 further comprising:

a second connection member formed of steel that is attached to the second segment; and, wherein the method of connecting the first vehicle support structure member to the second vehicle support structure member comprises the steps of:

heating the first segment to melt a second portion of the first segment; and, enveloping at least a portion of the second connection member within the second melted portion of the first segment.

19. The assembly of claim 16 wherein:

the second segment has a generally planar surface that contacts a generally planar surface of the first segment when the first segment is connected to the second segment; and, the first connection member is a portion of the second segment that extends beyond the planar surface of the second segment.

20. The assembly of claim 16 wherein:

the first connection member is heated to melt the at least a portion of the first segment.

* * * * *